Jan. 7, 1936.  J. A. MORRELL  2,026,905
SENSITIZED EVENER MOTION FOR PICKERS
Filed May 16, 1934  3 Sheets-Sheet 3
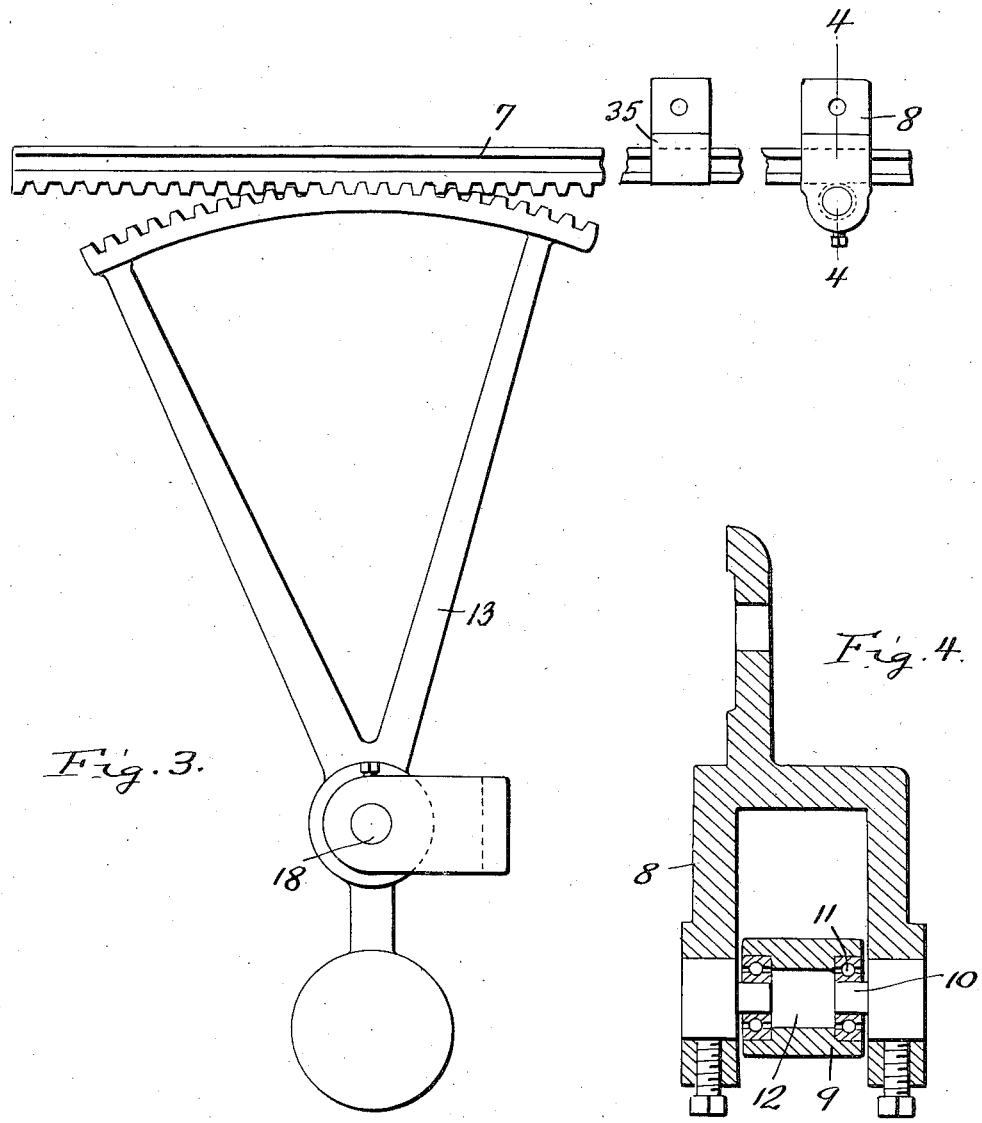
Inventor
Jno A. Morrell
By *Clarence A. O'Brien*
Attorney Patented Jan. 7, 1936

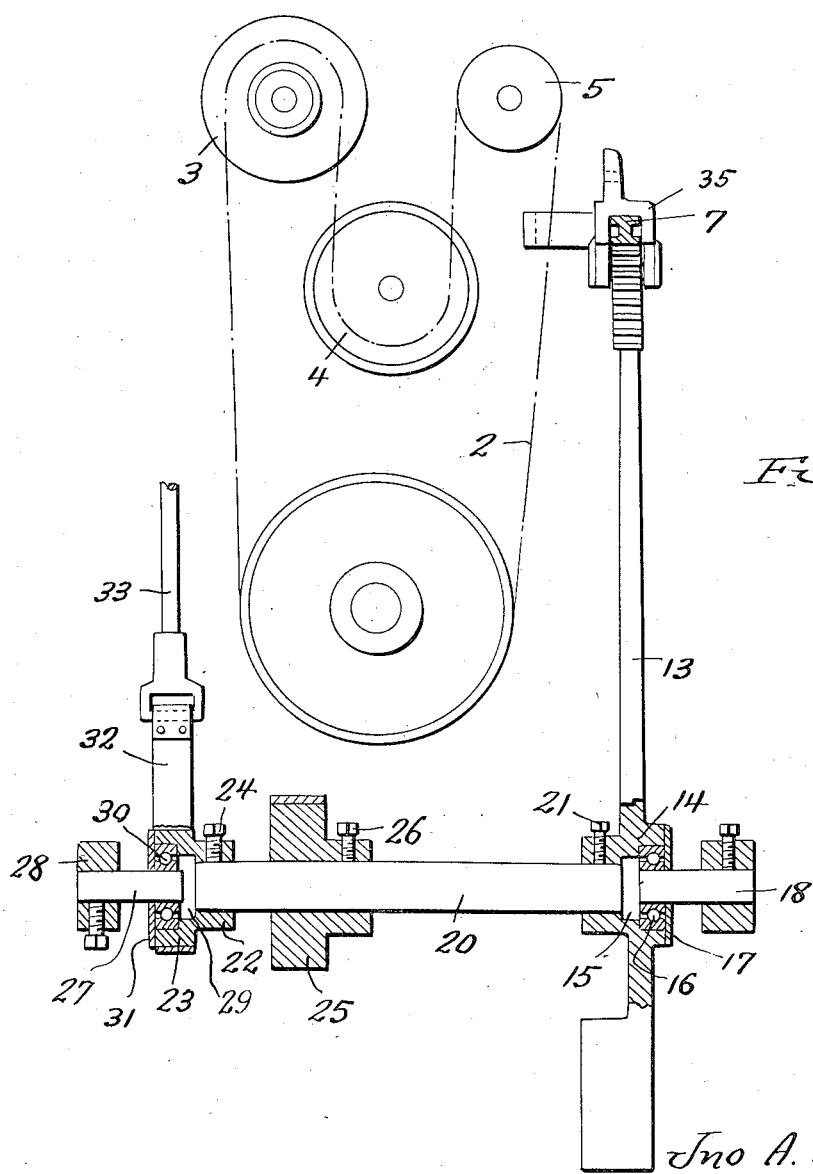

2,026,905

UNITED STATES PATENT OFFICE 2,026,905

SENSITIZED EVENER MOTION FOR PICKERS

John A. Morrell, Greer, S. C.

Application May 16, 1934, Serial No. 725,993

2 Claims. (Cl. 19—70)

This invention relates to an evener motion for pickers, the general object of the invention being to provide means to practically eliminate friction so that the evener motion will be more sensitive to the slightest variation of stock than with the devices as now constructed.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 2 is a view looking toward one side of the machine and showing parts in elevation and parts in section.

Figure 3 is a view of the quadrant and rack.

Figure 4 is a section on line 4—4 of Figure 3.

Figure 1:
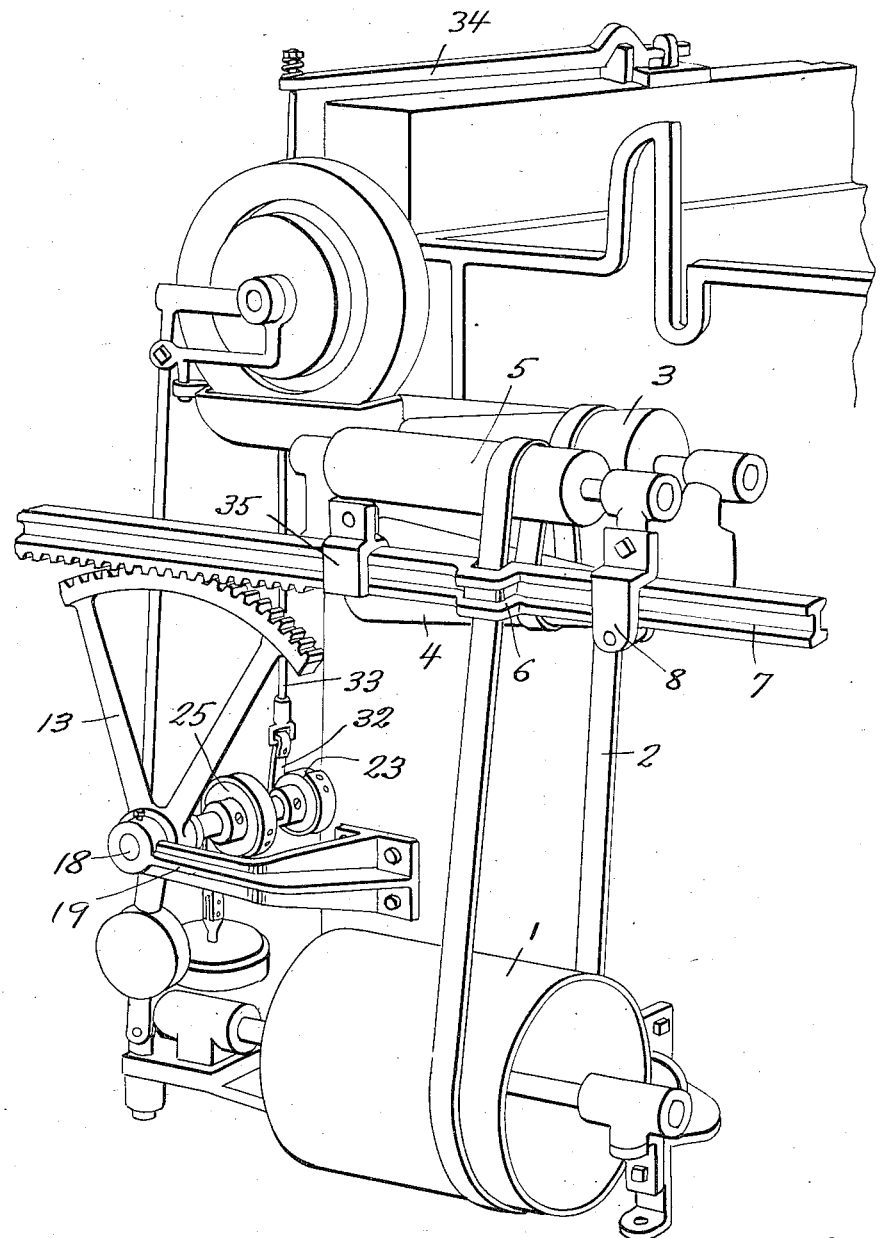
Figure 1 is a perspective view of portion of the picker mechanism.

In these drawings, the numeral 1 indicates the drive drum over which the belt 2 passes and the numerals 3 and 4 indicate the upper and lower cones and the numeral 5 the roll, the belt passing over these parts, as shown in Figures 1 and 2, in the usual manner. The belt passes through a loop 6 in the rack bar 7 so that movement of the rack bar will shift the belt on the cones and one part of my invention consists in providing the supporting bracket 8 for a part of the rack bar, with a roll 9 which is supported from the trunnions 10 by an anti-friction means 11, and to make the roll hollow, as shown at 12, so that it can be packed with lubricant.

The rack bar is engaged by the usual quadrant 13, the hub 14 of which has a chamber 15 therein opening out through one side or end thereof and this open side receives the anti-friction means 16 which are covered by a cap or closure plate 17. A stub shaft 18, carried by the bracket 19, enters the chamber and has the inner race of the bearing means 16 secured to its inner end, as shown more particularly in Figure 2. A shaft 20 has one end fastened to the hub 14 by a set screw 21 and its other end fastened to the hub 22 of a pulley disk 23 by a set screw 24 and this shaft carries the weighted disk 25 which is fastened to the shaft by the set screw 26. A stub shaft 27 is carried by the bracket 28 and enters the chamber 29 formed in the hub 22, the chamber containing the anti-friction means 30, the inner race of which is connected to the inner end of the shaft 27 and the chamber is closed by a plate 31. A strap 32 has one end connected with the disk 23 and its other end is connected to the rod 33, the upper end of which is connected with the operating lever 34 so that the shaft is rotated in one direction by the lever, the weighted disk 25 rotating the shaft in the opposite direction when the lever starts on its return movement.

From the foregoing, it will be seen that I provide a ball bearing shipper pulley or disk 23 which is connected to the rod 33 by a leather or other strap 32, these parts being used instead of the usual shipper rack, the shipper gear and the guide for the rack. It will also be seen that I provide a ball bearing for the quadrant which supports an end of the rack bar 7, the other end being supported by a roller provided with a ball bearing.

This invention eliminates practically all friction and allows the evener motion to work more sensitive to the slightest variation of stock, which makes a much more uniform lap and standard weights for lap are much more easily obtained. With this invention, there are less laps to be run over so that stronger and more even yarn is produced than in the old type of machine, and this will add much to the quality of the yarn and also to the production of the plant.

A guide 35 is provided for the rack bar 7 and the lower end of said guide is open so that the left hand end of the bar can rest on the quadrant, the anti-friction means of which carries the weight of this portion of the rack bar so as to eliminate friction on the rack bar.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:

1. A picker mechanism including a rack bar, a quadrant and an operating rod, said quadrant having a hub formed with a chamber opening out through one end thereof and a bore extending from the chamber through the other end, a disk having a chamber therein opening through one face thereof and a bore extending from the chamber through the other face, a shaft having its ends entering the bores, means for attaching the hub of the quadrant and the disk to the shaft, a pair of trunnions entering the chambers, supporting means for the trunnions, anti-friction means located in the chambers and located between the trunnions and the hub and the disk, plates connected to the hub and disk for holding the anti-friction means in place, the inner portions of the two chambers forming lubricant receiving spaces, a strap connected with the disk and means for connecting the strap to the operating rod, and a weighted disk connected with an intermediate part of the shaft.

2. A picker mechanism including a rack bar, an operating rod and a quadrant, a disk, supporting means for the disk including anti-friction means, supporting means for the hub of the quadrant including anti-friction means, a strap connecting the disk with the operating rod, a weighted disk connected with an intermediate part of the shaft, a bracket for supporting a part of the rack bar, a ball bearing supported roll carried by the bracket upon which said part of the rack bar rests and a second bracket placed between the first named bracket and that part of the rack bar engaged by the quadrant, said second bracket having its bottom open.

JOHN A. MORRELL.